United States Patent
Kumita et al.

(10) Patent No.: US 11,524,243 B2
(45) Date of Patent: Dec. 13, 2022

(54) GAME CONTROL METHOD, GAME SERVER, AND GAME SYSTEM

(71) Applicant: Universal Entertainment Corporation, Tokyo (JP)

(72) Inventors: Atsushi Kumita, Tokyo (JP); Toshikazu Jinnouchi, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 64 days.

(21) Appl. No.: 17/100,077

(22) Filed: Nov. 20, 2020

(65) Prior Publication Data

US 2021/0178275 A1    Jun. 17, 2021

(30) Foreign Application Priority Data

Dec. 17, 2019   (JP) .............................. JP2019-227403

(51) Int. Cl.
*A63F 13/795*     (2014.01)
*A63F 13/798*     (2014.01)
*A63F 13/77*      (2014.01)

(52) U.S. Cl.
CPC ............ *A63F 13/795* (2014.09); *A63F 13/77* (2014.09); *A63F 13/798* (2014.09); *A63F 2300/556* (2013.01); *A63F 2300/558* (2013.01)

(58) Field of Classification Search
CPC .................................................. A63F 13/795
See application file for complete search history.

(56) References Cited

U.S. PATENT DOCUMENTS

| | | | |
|---|---|---|---|
| 2009/0075738 A1* | 3/2009 | Pearce ................... | A63F 13/79 709/218 |
| 2009/0239668 A1* | 9/2009 | Han ....................... | A63F 13/73 463/42 |
| 2012/0311036 A1* | 12/2012 | Huhn .................... | G06Q 50/01 709/204 |
| 2013/0165234 A1* | 6/2013 | Hall ...................... | A63F 13/795 463/42 |
| 2014/0004960 A1* | 1/2014 | Soti ....................... | A63F 13/795 463/42 |
| 2014/0243098 A1* | 8/2014 | Yong ..................... | G06Q 10/10 463/42 |

(Continued)

OTHER PUBLICATIONS

Sieber, Tina, "Facebook Friend Requests: Unwritten Rules and Hidden Settings," available at https://web.archive.org/web/20190622120858/https://www.makeuseof.com/tag/facebook-friend-requests-unwritten-rules-hidden-settings-weekly-facebook-tips/, Jun. 22, 2019 (Year: 2019).*

*Primary Examiner* — Jay Trent Liddle
(74) *Attorney, Agent, or Firm* — Lex IP Meister, PLLC (57) ABSTRACT

A game control method, a game server, and a game system with which a user can efficiently increase the number of friends in a game with a friend-up function are provided. When a friend candidate list image 230 of a recommended friend search screen 23 is generated in response to a request from an information processor 1 connected to a game server 10 over a communication line, the game server 10 generates a list of friend candidates with reference to a friend seeking flag. The friend seeking flag is stored in association with a user ID by which each user is identified, and indicates whether the user corresponding to the user ID is seeking friends.

14 Claims, 9 Drawing Sheets

(56) References Cited

U.S. PATENT DOCUMENTS

| | | | |
|---|---|---|---|
| 2014/0256424 A1* | 9/2014 | Yamada | A63F 13/795 463/29 |
| 2015/0065253 A1* | 3/2015 | Joo | A63F 13/33 463/42 |
| 2015/0148127 A1* | 5/2015 | Saraf | A63F 13/795 463/31 |
| 2018/0193753 A1* | 7/2018 | Kiwada | A63F 13/795 |
| 2019/0091583 A1* | 3/2019 | Oyama | A63F 13/795 |
| 2019/0192976 A1* | 6/2019 | Hirota | A63F 13/533 |
| 2019/0354562 A1* | 11/2019 | Gan | G06F 16/9535 |
| 2021/0178275 A1* | 6/2021 | Kumita | A63F 13/798 |

* cited by examiner

FRIEND INFORMATION TABLE

| USER | FRIEND TARGET | STATE | REQUEST DATE AND TIME |
|---|---|---|---|
| 11111111 | 33333333 | FRIEND | — |
| 11111111 | 44444444 | FRIEND | — |
| 11111111 | 55555555 | WAITING APPROVAL | 2019/12/15 16:54 |
| 11111111 | 66666666 | BLOCKING | — |
| 11111111 | 77777777 | BLOCKED | — |
| 22222222 | 88888888 | REQUESTING | 2019/12/13 12:16 |
| 22222222 | 99999999 | WAITING APPROVAL | 2019/12/11 07:24 |
| ... | ... | ... | ... |

FIG.7

USER INFORMATION TABLE

| USER ID | USER NAME | ... | FRIEND SEEKING FLAG | NUMBER OF FRIENDS | NUMBER OF FRIEND REQUESTS | NUMBER OF USERS WAITING APPROVAL | ACCESS DATE AND TIME |
|---|---|---|---|---|---|---|---|
| 11111111 | AA | ... | ON | 45 | 10 | 5 | 2019/12/15 16:54 |
| 22222222 | BB | ... | OFF | 120 | 2 | 0 | 2018/08/21 12:48 |
| 33333333 | CC | ... | ON | 112 | 1 | 20 | 2019/12/14 20:19 |
| 44444444 | DD | ... | ON | 87 | 0 | 4 | 2019/12/12 07:27 |
| 55555555 | EE | ... | OFF | 46 | 5 | 9 | 2018/11/25 23:57 |
| 66666666 | FF | ... | ON | 95 | 1 | 0 | 2019/08/05 09:09 |
| 77777777 | GG | ... | OFF | 21 | 9 | 1 | 2019/12/15 15:24 |
| ... | ... | ... | ... | ... | ... | ... | ... |

GAME CONTROL METHOD, GAME SERVER, AND GAME SYSTEM

CROSS-REFERENCE TO RELATED APPLICATION

The present application claims priority from Japanese Patent Application No. 2019-227403, which was filed on Dec. 17, 2019, the disclosure of which is herein incorporated by reference in its entirety.

BACKGROUND I/F THE INVENTION

1. Field of the Invention

The present invention relates to a game control method, a game server, and a game system.

2. Description of Related Art

There is a known arrangement in which a game is played based on cooperation between gaming terminals which are connected with one another via a server. For example, Patent Literature 1 (U.S. Pat. No. 8,636,593) discloses an arrangement in which gaming terminals and upper displays constituting one common effect display screen are provided, whether a common game is being run is determined when a gaming terminal starts an independent special game, and an effect is performed at the gaming terminal only when the common game is not being run. In this way, game play based on cooperation of gaming terminals has been of importance to the enhancement of interest in the game and improvement of the value of the gaming machine.

In recent years, games playable on mobile devices such as tablet PCs and smartphones have become popular. In such games played on mobile devices, game play based on cooperation between users has been important. However, being different from past dedicated gaming machines, a user of a game on a mobile device is often "befriended" with other users in the game. Being befriended with other users in the game, each user is able to obtain advantages and becomes attached to the game. Furthermore, by the friend-up function in the game, the game provider provides users to have an opportunity to play the game for a long time.

In such games, a friend candidate list used for befriending one another is typically determined based on log-in times. In this regard, because users who are similar to one another in log-in time tend to play the game in a similar time period of each day. On this account, when candidates of friends are searched and listed, the friend candidates in the friend candidate list are more or less unchanged even if the search is performed over and over again. Because a user who previously declined a friend request is unlikely to accept another friend request, it is disadvantageously difficult for each user to increase the number of friends.

SUMMARY I/F THE INVENTION

Under this circumstance, the inventors of the present invention considered that a known process of controlling friend requests was inefficient, and provide a game control method, a game server, and a game system with which a user can efficiently increase the number of friends in a game with a friend-up function.

A game control method of the present invention is arranged such that a storage device of a game server connected to information processors over a communication line stores:

sets of identification information for identifying users;

a program which samples sets of identification information of friend candidates from the sets of identification information and generates image data for listing and displaying users corresponding to the sampled sets of identification information; and flag data which indicates whether a user associated with each of the sets of identification information stored in the storage device is seeking friends, and a controller of the game server runs the program to execute a process of, when the image data is generated in response to an input to an operation unit of one of the information processors, generating a list of the friend candidates with reference to the flag data.

According to this game control method, a friend request is accepted with reference to flag data indicating that friends are being sought, with the result that the possibility of efficiently increasing the number of friends is improved.

The game control method of the present invention may be arranged so that, the controller causes the storage device to store an access date and time on which each of the information processors accesses the server in association with each of the sets of identification information, and in the process of generating the list of the friend candidates, the controller sorts the sampled sets of identification information so that users corresponding to the sampled sets of identification information are sorted in a descending order of access dates and times.

According to this arrangement, the users show are the listed friend candidates are sorted in the descending order of access dates and times. As a result users who are likely to frequently access the server are ranked high, with the result that the possibility of efficiently increasing the number of friends is improved.

The game control method of the present invention may be arranged so that, in the process of generating the list of the friend candidates, the controller excludes a set of identification information corresponding to a user whose number of friends is at the maximum from the list, among the sampled sets of identification information.

According to this arrangement, because a user whose number of friends is at the maximum is excluded from the list of friend candidates, the possibility of more efficiently increase the number of friends is improved.

The game control method of the present invention may be arranged so that, in the process of generating the list of the friend candidates, the controller excludes a set of identification information corresponding to a user who received friend requests as many as a first predetermined number from the list, among the sampled sets of identification information.

According to this arrangement, a user who received friend requests as many as the first predetermined number is excluded from the list of friend candidates. Because a user who tends not to make a decision on each friend request for a long time is excluded, the possibility of efficiently increasing the number of friends is improved.

The game control method of the present invention may be arranged so that, in the process of generating the list of the friend candidates, the controller sorts the sampled sets of identification information so that users each of whose number of friends is equal to or smaller than a second predetermined number are ranked high in the list.

According to this arrangement, in the list of friend candidates, users each of whose number of friends is equal to or smaller than the second predetermined number are ranked high. Because users each having a small number of friends are ranked high, the possibility of further efficiently increasing the number of friends is improved.

The present invention relates to a game server connected to information processors over a communication line, including:
sets of identification information for identifying users;
a program which samples sets of identification information of friend candidates from the sets of identification information and generates image data for listing and displaying users corresponding to the sampled sets of identification information; and
flag data which indicates whether a user associated with each of the sets of identification information stored in the storage device is seeking friends; and
a controller which runs the program to execute a process of, when the image data is generated in response to an input to an operation unit of one of the information processors, generating a list of the friend candidates with reference to the flag data.

According to this game control method, a friend request is accepted with reference to flag data indicating that friends are being sought, with the result that the possibility of efficiently increasing the number of friends is improved.

A game system of the present invention includes information processors and a game server connected to the information processors over a communication line,
a storage device of the game server storing:
sets of identification information for identifying users;
a program which samples sets of identification information of friend candidates from the sets of identification information and generates image data for listing and displaying users corresponding to the sampled sets of identification information; and
flag data which indicates whether a user associated with each of the sets of identification information stored in the storage device is seeking friends,
a controller of the game server running the program to execute a process of, when the image data is generated in response to an input to an operation unit of one of the information processors, generating a list of the friend candidates with reference to the flag data.

According to this game control method, a friend request is accepted with reference to flag data indicating that friends are being sought, with the result that the possibility of efficiently increasing the number of friends is improved.

DETAILED DESCRIPTION I/F THE INVENTION

An information processor of the present invention will be described with reference to figures.

Figure 1:
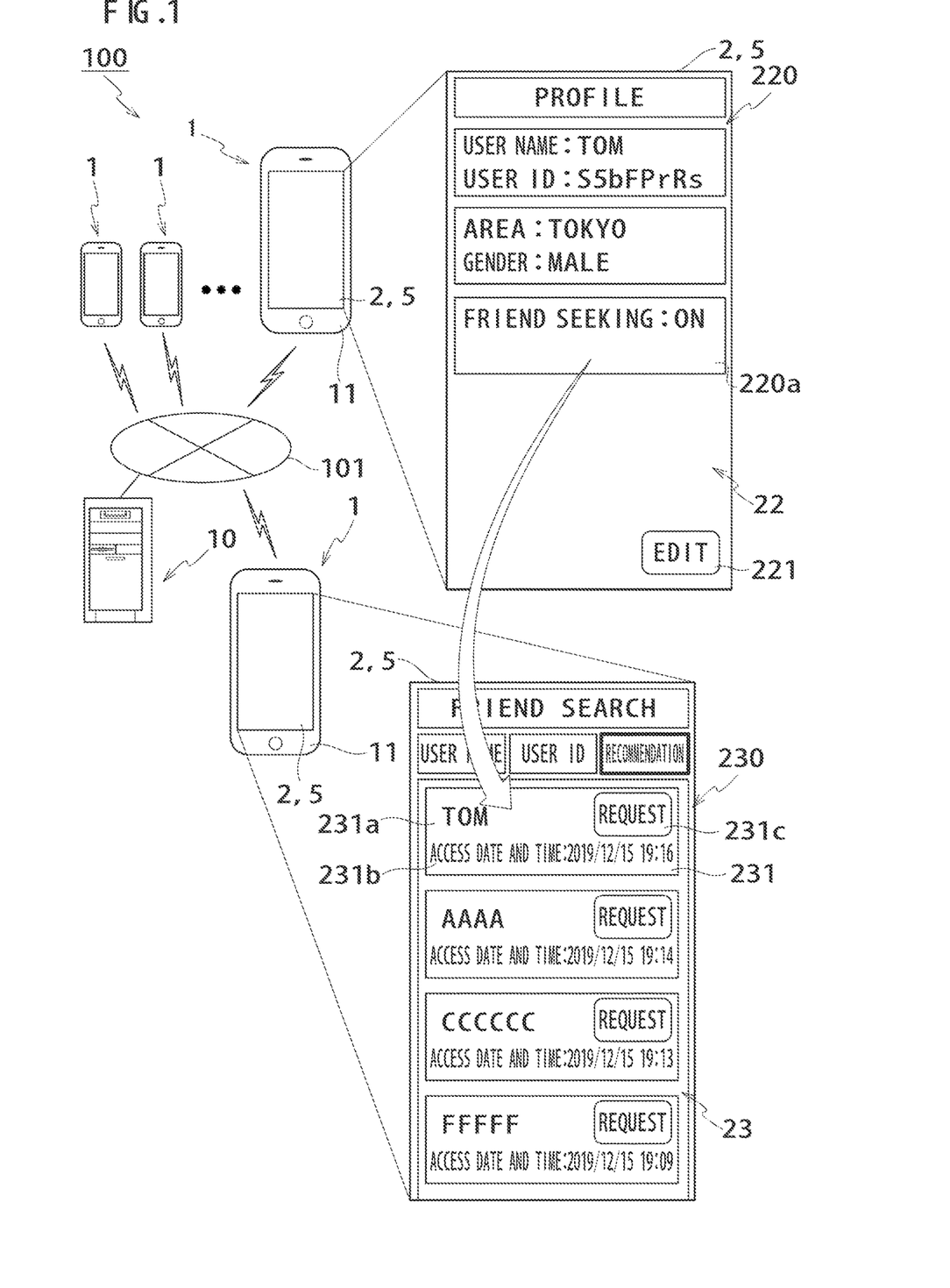
FIG. 1 is an explanatory diagram showing an operation state of the present invention.

As shown in FIG. 1, a game system 100 is arranged such that, in recommendation search on a friend search screen, users satisfying a predetermined condition among users for each of whom flag data indicating whether to be looking for a friend is ON are ranked high and preferentially displayed in a result of the search.

In the game system 100, an information processor 1 is connected to a game server 10 through the Internet 101 so that data can be transmitted therebetween. The game system 100 is constituted by the information processor 1 and the game server 10. It should be noted that the game system 100 is not limited to this, and the system may be constituted only by the information processor 1.

The explanations below may presuppose that a user has logged in the game server 10 through the information processor 1. For example, the user inputs a user ID and a password to the information processor 1 and the log-in of the user is authenticated by the game server 10 through a communication line. The information processor 1 may store log-in information for the log-in authentication, and at the activation of the game by the user, the user may be able to automatically log in the game server 10 without inputting information, by means of the stored log-in information. Alternatively, in the information processor 1, the user may be able to automatically log in the game server 10 without inputting information, by means of biometrics authentication of the user at the activation of the game by the user. Known examples of biometric information used for biometrics authentication include a face, a fingerprint, a retina, an iris, a vein pattern, and a sonogram. In this way, the game server 10 allows the user to log in the information processor 1 and play the game.

The information processor 1 includes a display 2 provided on the front surface of a housing 11 and a touch panel 5 provided throughout the display 2. The information processor 1 may be a mobile device or a desktop device. Examples of the mobile information processor 1 include: portable computers, laptop personal computers, note personal computers, tablet personal computers, hand-held personal computers, PDA (Personal Data Assistant), smartphones and the like.

The display 2 is configured to be able to display images. The display method of the display 2 is, for example, liquid crystal, organic electroluminescence, CRT (Cathode Ray Tube), or plasma. The touch panel 5 makes it possible to detect the coordinates of a part touched by a user's finger or the like. The touch panel 5 adopts an already known technology such as electromagnetic induction and electrostatic capacity. The information processor 1 determines an object on the screen touched by the user, or the state of the touching such as swipe and the like based on coordinates detected by the touch panel 5, and makes a response according to the determination result.

Further, in the present embodiment, the touch panel 5 operates as an input device, and accepts a swipe input, a touch input, and the like; however, the present embodiment is not limited to this. For example, a microphone or a camera may be adopted as an input device, and may receive the user's voice or gesture as an instruction input.

As shown in FIG. 1, in the game system 100, the display 2 of the information processor 1 displays a profile screen 22 on which the profile information of the user can be set and viewed. To put it differently, when a request to view a profile screen 22 is sent from a terminal device 1 in which the user has logged by using the user ID, etc., the game server 10 displays, on that terminal device 1, the profile screen 22 based on profile information associated with the user ID.

In the profile screen 22, a profile information display area 220 is provided to show various types of user information. Displayed in the profile information display area 220 are sets of information such as a user name and a user ID and friend seeking information 220a indicating whether a user is seeking friends. In the profile information display area 220, furthermore, an edit button 221 is provided. A touch input is made by the edit button 221 when the user wishes to edit his/her user information. When a touch input is made by the edit button 221, the profile screen 22 shifts to an unillustrated profile editing screen. In the profile editing screen, the user is allowed to change the above-described sets of user information including the friend seeking information 220a by himself/herself.

The user information including the friend seeking information 220a is stored in the game server 10 in association with each user ID. To put it differently, the game server 10 stores flag data which indicates whether a user associated with each user ID, which is identification information for specifying each user, is seeking friends.

In addition to the above, as shown in FIG. 1, in the game system 100, the display 2 of the information processor 1 displays a recommended friend search screen 23 showing users who are candidates of friends. On the recommended friend search screen 23, a friend candidate list image 230 which is an image of listed users for friend request is displayed. In the friend candidate list image 230, friend candidates 231 each showing information of a user who is a friend candidate are listed. While in the present embodiment a user name 231a and an access date and time 231b are displayed in each friend candidate 231, the disclosure is not limited to this arrangement. For example, a user ID, a text input by the user through the profile editing screen, etc. may be displayed in the friend candidate 231.

In addition to the above, a friend-request button 231c is displayed in each friend candidate 231. The friend-request button 231c is touched when the user wishes to send a friend request to a user indicated by the corresponding friend candidate 231.

Figure 2:
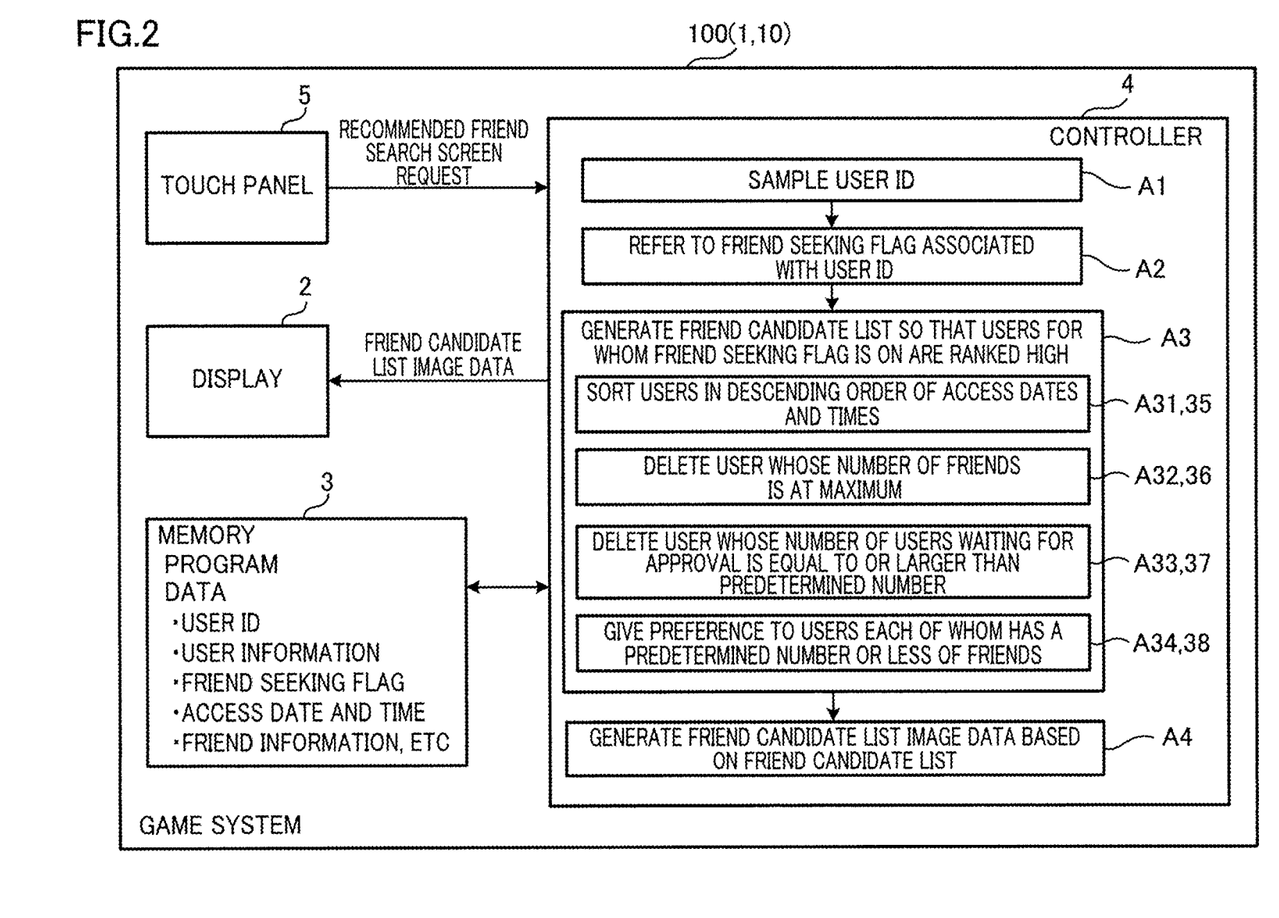
FIG. 2 is an explanatory diagram which outlines an arrangement of the present invention.

As shown in FIG. 2, the game system 100 includes the information processor 1 and the server 10 each of which is a computer, the display 2, a memory 3, a controller 4, and the touch panel 5.

The display 2 and the touch panel 5 are provided in the information processor 1, and function as an output device and an input device in the game system 100, respectively.

The memory 3 stores various programs including a game program executed by the controller 4 and various data used in the various programs. The memory 3 is a conceptual storage area in the game system 100, which may be implemented either in the information processor 1 or in the server 10. Alternatively, the function of the memory 3 may be separately implemented in the information processor 1 and the server 10, or the function of the memory 3 may be implemented both in the information processor 1 and the server 10. That is, in the game program executed in the information processor 1, if data stored in the server 10 is necessary, the information processor 1 requests the data to the server 10, and the server 10 responds to such a request of data.

The data and programs to be stored in the memory 3 may be stored in advance at the time of shipping from the plant, or may be stored by downloading them via a communication network from the not-shown server and the like. The communication means may be an interactive communication passage such as the Internet and a cable TV, or may be one-way broadcasting.

Further, the data and programs to be stored in the memory 3 may be stored in a storage medium such as a floppy disc, CD-ROM, DVD-ROM, MO (Magneto-Optical Disc), a flash memory, and may be read out from such a storage medium as needed and installed in the memory 3.

The controller 4 executes various types of processing according to the game program stored in the memory 3. The controller 4 is a conceptual execution device in the game system 100, which may be implemented either in the information processor 1 or in the server 10. Alternatively, the function of the controller 4 may be separately implemented in the information processor 1 and the server 10, or the function of the controller 4 may be implemented both in the information processor 1 and the server 10.

As described, the game system 100 functions as a single computer including the information processor 1 having the input device (touch panel 5) and an output device (display 2), and the information processor 1 and/or a server 10 serving as the memory 3 and the controller 4.

The memory 3 stores, for example, the following sets of data. The memory 3 stores: a user ID which is identification information for identifying each of users; a program by which user IDs of friend candidates are sampled and data of a friend candidate list image 230 by which users corresponding to the sampled user IDs are listed and displayed is generated; and a friend seeking flag which is flag data associated with each user ID and indicates whether the user associated with the user ID is seeking friends. In addition to this, the memory 3 may store, in association with the user ID, an access date and time on which the user accesses the server 10 from the information processor 1 in which the user has logged in. Furthermore, the memory 3 may store friend information indicating, for example, the friendship between user IDs and the number of friends associated with each user ID.

When the touch panel 5 of the information processor 1 detects an input requesting the recommended friend search screen 23, the controller 4 runs a program which executes processes described below. In other words, the program stored in the memory 3 causes the game system 100 as the computer to execute the processes described below. To be more specific, the controller 4 executes a process of sampling a user ID (A1), a process of referring to a friend seeking flag associated with the sampled user ID (A2), a process of generating a friend candidate list so that user IDs for which the friend seeking flags are ON are ranked high (A3), and a process of obtaining user information corresponding to the user IDs in the generated friend candidate list and generating data of a friend candidate list image 230 (A4).

In the present embodiment, in the process (A3) of generating the friend candidate list, an access date and time and friend information stored in the memory 3 are referred to. In other words, in the process (A3), the controller 4 executes a process of further sampling a user ID for which the friend seeking flag is ON from the sampled user IDs and adding the sampled ID to the friend candidate list so that user IDs associated with the most recent dates and times are ranked high (A31), a process of deleting, from the user IDs added in the process (A31), a user ID in which the number of friends has reached the maximum (A32), a process of deleting, from the user IDs added in the process (A31), a user ID in which the number of users waiting for the approval (i.e., the number of received friend requests) has reached a first predetermined number (A33), and a process of selecting a user ID in which the number of friends is equal to or smaller than a second predetermined number from the user IDs added in the process (A31) and ranking the selected user ID high (S34).

Furthermore, the controller 4 executes a process of further sampling a user ID for which the friend seeking flag is OFF from the sampled user IDs and adding the sampled ID to the friend candidate list so that user IDs associated with the most recent dates and times are ranked high (A35), a process of deleting, from the user IDs added in the process (A35), a user ID in which the number of friends has reached the maximum (A36), a process of deleting, from the user IDs added in the process (A35), a user ID in which the number of users waiting for the approval (i.e., the number of friend requests) has reached a first predetermined number (A37), and a process of selecting a user ID in which the number of friends is equal to or smaller than a second predetermined number from the user IDs added in the process (A35) and ranking the selected user ID high (A38).

In addition to the above, as the game system 100 including the program above executes the processes (A1) to (A4), a game control method in which the processes (A1) to (A4) are executed by the game system 100 (computer) is embodied. In other words, the game system 100 includes a plurality of processing units configured to execute the processes (A1) to (A4), respectively. While the descriptions below deal with the game system 100 including the information processor 1 and the server 10, processes and operations of the information processor 1 can be interpreted as those of a program or a game control method. Further, the processes executed by the controller 4 may be executed only in the information processor 1, or only a function as the database may be implemented in the server 10. That is, the processes and operation of the game system 100 may be paraphrased as an invention of the information processor 1.

As such, the game system 100 includes the information processors 1 and the game server 10 connected to the information processors 1 through the Internet 101. The game server 10 stores: a user ID which is identification information for identifying each of users; a program by which user IDs of friend candidates are sampled and data of a friend candidate list image 230 by which friend candidates 231 corresponding to the users with the sampled user IDs are listed and displayed is generated; and flag data associated with each user ID for specifying the user and indicates whether the user associated with the user ID is seeking friends. In response to an input to the touch panel 5 of the information processor 1, when the friend candidate list image 230 is generated, the game server 10 runs the program to execute a process of generating a list of the friend candidates 231 with reference to the friend seeking flag. In this way, a friend request is accepted with reference to flag data indicating that friends are being sought, with the result that the possibility of efficiently increasing the number of friends is improved.

When a user makes a friend request, the user ID of the user who makes the friend request is associated with the user ID of the user who is the target of the friend request in the storage device of the server 10, and a state of allowing friendship is established. The state of allowing friendship indicates a state in which a user who has sent a friend request to a user who is the target of the friend request is waiting for an answer to the friend request from the targeted user. In other words, the user who has sent the friend request asks the targeted user whether to accept the friend request, and when the targeted user accepts the request, the user having sent the friend request and the targeted user become in a friendship state and associated with each other. When the targeted user refuses to accept the friend request, the state of allowing friendship is canceled and the state before the state of allowing friendship is reinstated. If the targeted user blocks the user who has sent the friend request, shift to the state of allowing friendship may be prohibited from then on.

Figure 3:
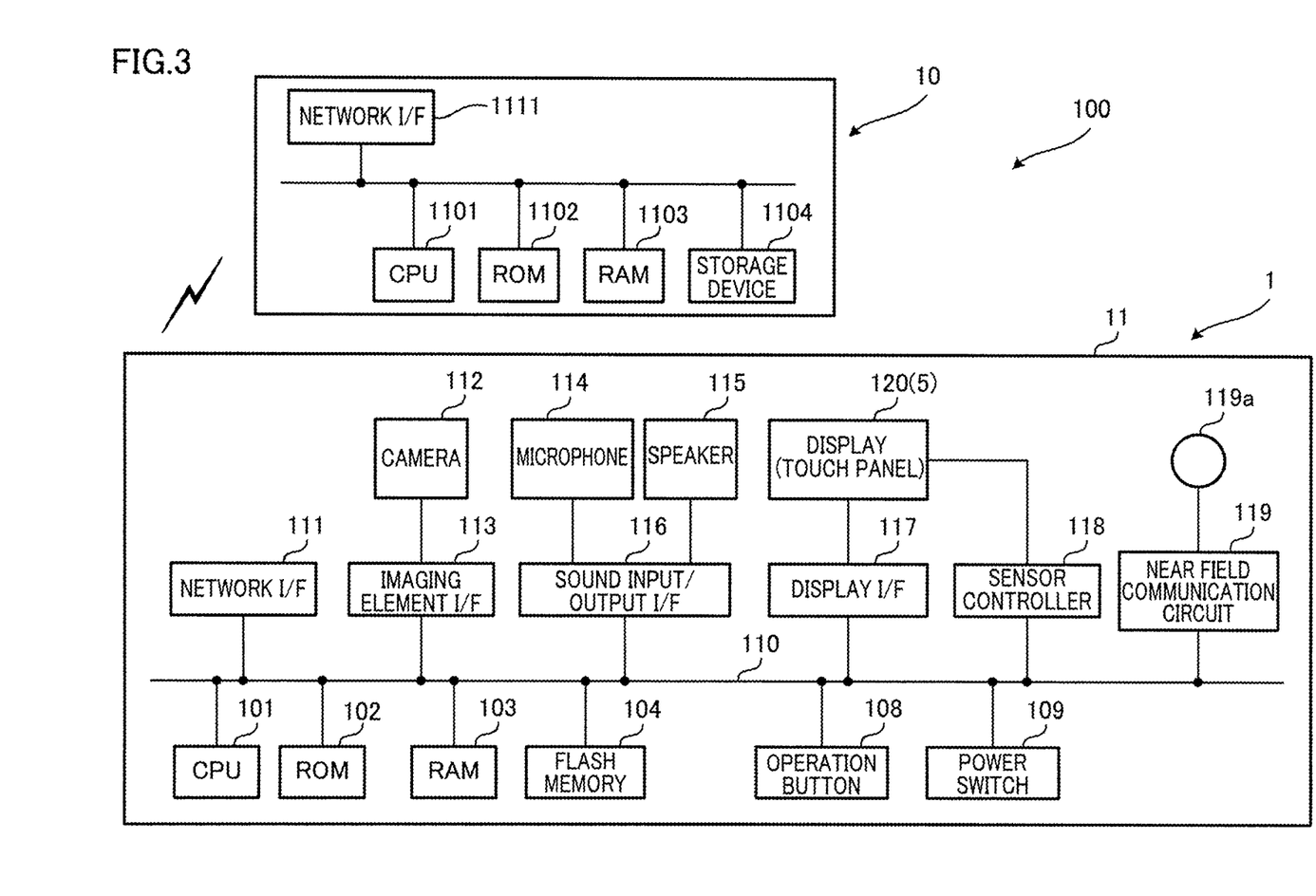
FIG. 3 is a block diagram of the electrical configuration of the information processor.

As shown in FIG. 3, the information processor 1 includes, in the housing 11, a CPU 101, a ROM 102, a RAM 103, a flash memory 104, an operation button 108, a power switch 109, a bus line 110, a network I/F 111, a camera 112, an imaging element I/F 113, a microphone 114, a speaker 115, a sound input/output I/F 116, a display I/F 117, a sensor controller 118, a near field communication circuit 119, and an antenna 119a of the near field communication circuit 119.

Further, the game server 10 is a so-called computer including a CPU 1101, a ROM 1102, a RAM 1103, a storage device 1104 such as a hard disk drive and the like, and a network I/F 1111.

The CPU (Central Processing Unit) 101 and the CPU 1101 function as a main structure of the controller 4, and control the entire operation of the game system 100. The ROM (Read Only Memory) 102 and the ROM 1102 store programs used for driving the CPU 101 and CPU 1101, such as an IPL (Initial Program Loader).

The RAM (Random Access Memory) 103 and the RAM 1103 are used as a work area of the CPU 101 and the CPU 1101. The flash memory 104 stores the game program, a program for communication, and plural sets of data such as image data and sound data. The operation button 108 is used for, for example, initial setting of the information processor 1. The power switch 109 is used for turning on/off the power source of the information processor 1.

The storage device 1104 functions as a database, and stores game data of each of the plurality of information processors 1. In response to a request from the game program in the information processor 1, the game server 10 returns as needed a response referring to the database in the storage device 1104.

The network I/F (Interface) 111 and the network I/F 1111 are each an interface for data communications using a communication network such as the internet. The camera 112 is a built-in camera image capturing means which captures an image of an object to obtain image data under the control of the CPU 101. The imaging element I/F 113 is a circuit for controlling the camera 112. The microphone 114 is a built-in sound collection means to which sound is input. The sound input/output I/F 116 is a circuit for processing input and output of a sound signal between the microphone 114 and the speaker 115 under the control of the CPU 101. The display I/F 117 is a circuit for sending image data to the display 2 under the control of the CPU 101. The display 2 is provided on the front surface of the housing 11. The sensor controller 118 is a circuit for receiving an input from the touch panel 5 of the display 2. The near field communication circuit 119 is a communication circuit based on NFC (Near Field Communication) (Registered Trademark). Bluetooth (Registered Trademark), or the like. The bus line 110 is an address bus, a data bus, or the like for electrically connecting the components such as the CPU 101.

The following specifically describes a display screen displayed on the display 2 of the information processor 1.

Figure 4:
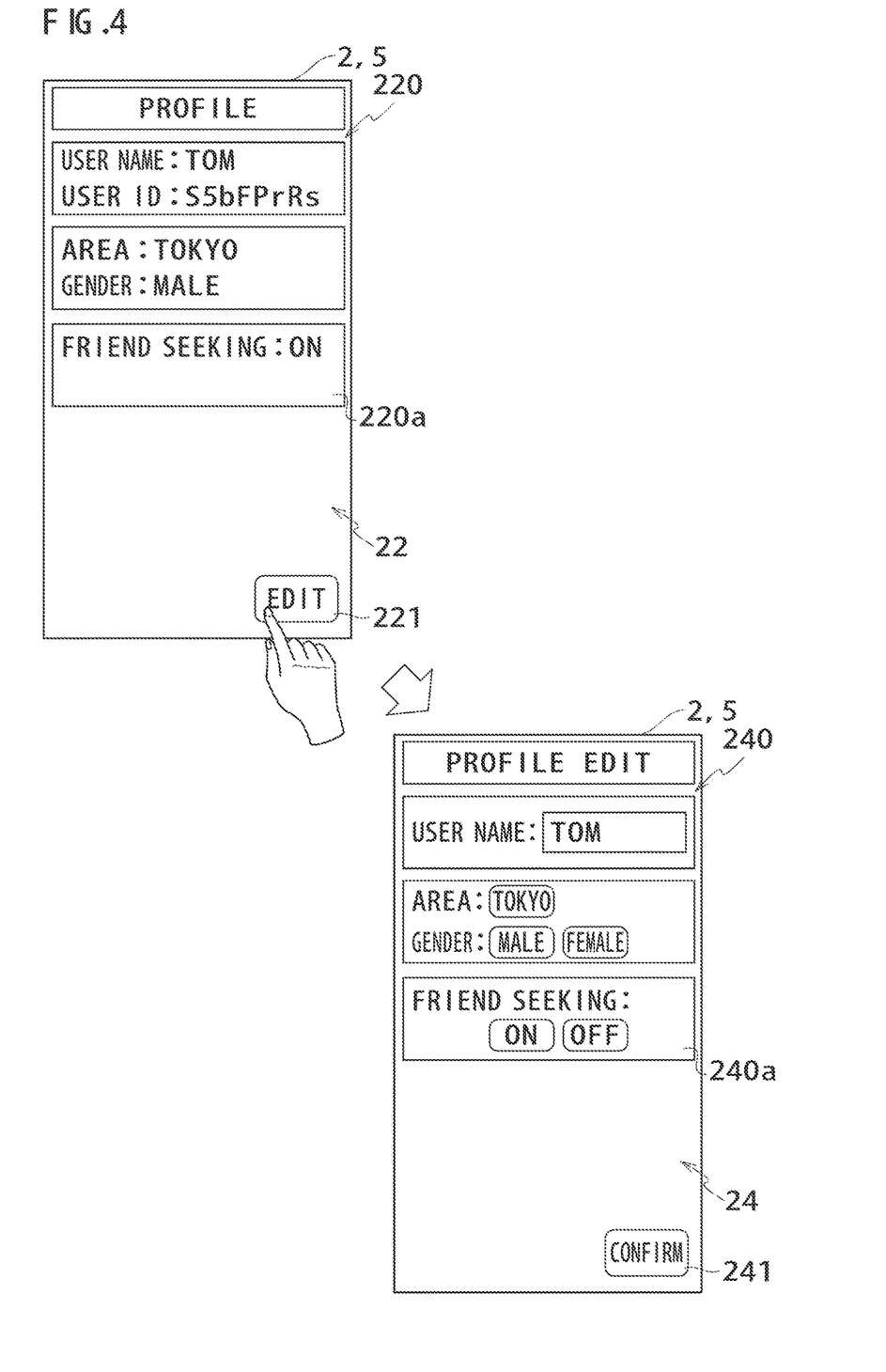
FIG. 4 shows an example of a display screen of an information processor.

As shown in FIG. 4, when a touch input is made to the edit button 221 in the profile screen 22, the screen shifts to a profile editing screen 24 in which the user information shown in the profile information display area 220 of the profile screen 22 is editable. In the profile editing screen 24, a profile information edition region 240 is provided to allow various sets of user information to be edited. In the profile information edition region 240, a friend seeking change button 240a is displayed to edit the user name, etc. and to switch on and off the friend seeking information 220a indicating whether the user is seeking friends. Although not illustrated, when the friend seeking information 220a is switched on by using the friend seeking change button 240a, a notification that the user is ranked high in a recommended friend search screen 23 of another user may be displayed on the display 2. When the friend seeking information 220a is switched off by using the friend seeking change button 240a, a notification that the user is no longer ranked high in a recommended friend search screen 23 of another user may be displayed on the display 2.

Figure 5:
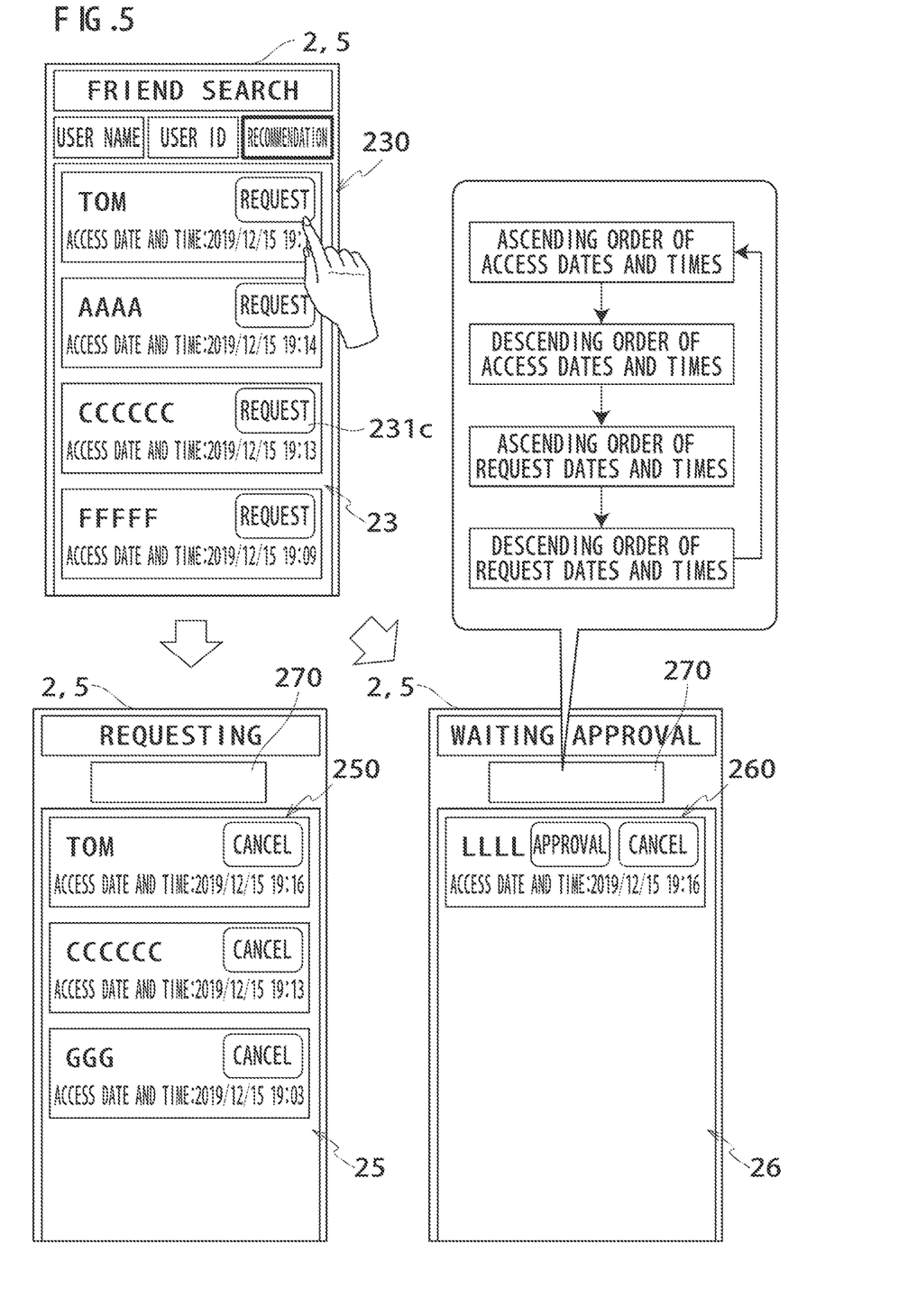
FIG. 5 shows an example of the display screen of the information processor.

As shown in FIG. 5, when a touch input is made to the friend-request button 231c in the recommended friend search screen 23, etc., the user who is the target of the request is displayed on a requesting screen 25 of the information processor 1 in which the user who made the friend request has logged. To be more specific, the requesting screen 25 displays a requesting list image 250 showing users to which the request has been made. The requesting list image 250 displays all user to which the request has been made by touch inputs to the friend-request button 231c, and displays a button for canceling the request to each user.

As shown in FIG. 5, an approval waiting screen 26 of the information processor 1 in which the user who received the friend request displays the users who sent the friend request. To be more specific, the approval waiting screen 26 displays an approval waiting list image 260 which indicates users who sent the friend request to this user. The approval waiting list image 260 displays all users who made the friend request by making a touch input to the friend-request button 231c corresponding to the targeted user in the recommended friend search screen 23, etc., and displays a button which allows the targeted user to accept or refuse the friend request from each user.

In both of the requesting screen 25 and the approval waiting screen 26, a sort button 270 is provided. Each time the user presses the sort button 270, the order of displaying the users in the requesting list image 250 or the approval waiting list image 260 is changed to the ascending order of access dates and times, the descending order of access dates and times, the ascending order of dates and times of making friend requests, and the descending order of dates and times of making friend requests.

The following describes data tables stored in the storage device 1104 of the game server 10.

Figure 6:
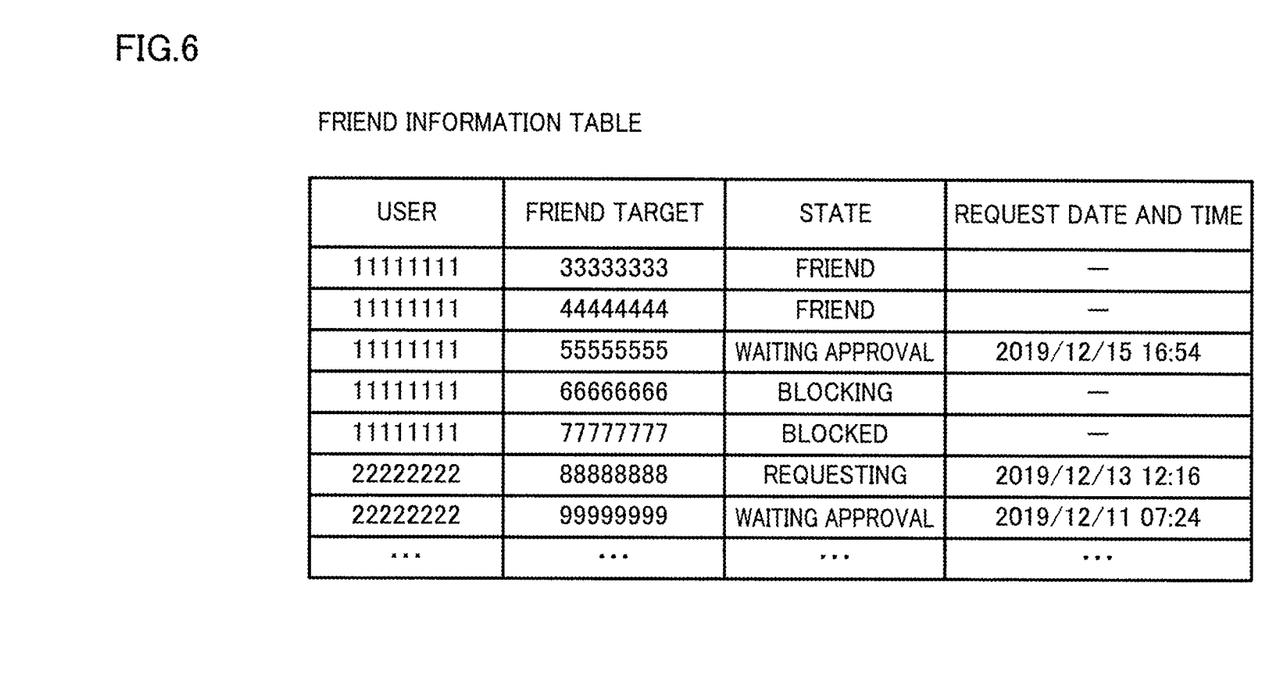
FIG. 6 is an explanatory diagram of a friend information table.

As shown in FIG. 6, a friend information table has a user column, a friend target column, a state column, and a request date and time column. The user column and the friend target column store user IDs of users each playing the game by using the information processor 1. The state column stores the status of the friendship state of a user (subject user) stored in the user column with respect to a user (object user) stored in the friend target column. The request date and time column stores a date and time when a subject user sent a friend request to an object user.

Examples of the status of the friendship state are a friendship state, a requesting state, an approval waiting state, a blocking state, and a blocked state. The friendship state indicates that a subject user and an object user are friends. The requesting state indicates that a subject user sent a friend request to an object user. The approval waiting state is a state in which a subject user is waiting for approval of the friend request by an object user. In other word, the requesting state and the approval waiting state are states of allowing a subject user and an object user to be befriended. The blocking state indicates that a subject user refuses to be in the friendship state with an object user. The blocked state indicates that an object user refuses to be in the friendship state with a subject user.

Figure 7:
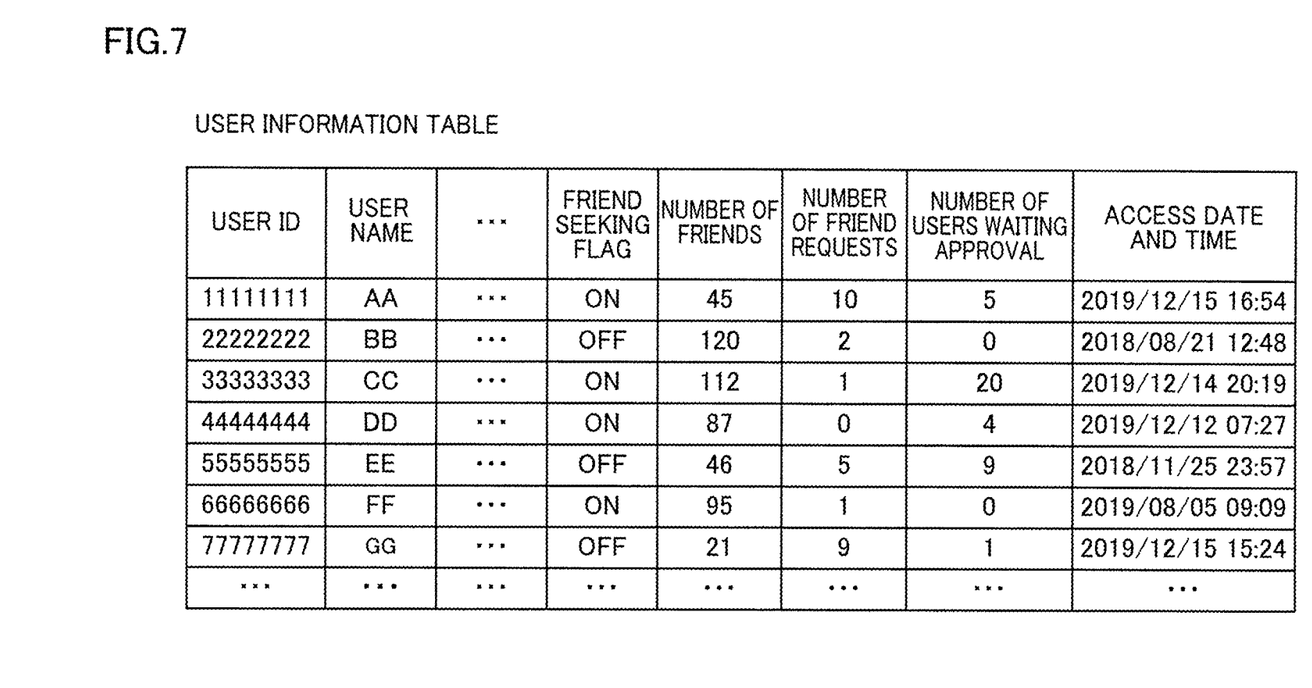
FIG. 7 is an explanatory diagram of a user information table.

As shown in FIG. 7, the user information table has a user ID column, a user name column, a friend seeking flag column, a friend number column, a friend request number column, an approval waiting number column, and an access date and time column. Although not illustrated, the user information table has an area where user information associated with a user ID, such as gender is stored.

The user column stores user IDs for identifying users each playing the game by using the information processor 1. The user name column stores user names which are set by users at will. The friend seeking flag column stores a friend seeking flag which is set in the profile editing screen 24 by the user. The friend number column stores the number of users in the "friendship state" among friend targets associated with user IDs in the friend information table (see FIG. 6). The friend request number column stores the number of users in the "requesting state" among friend targets associated with user IDs in the friend information table. The approval waiting number column stores the number of users in the "approval waiting state" among friend targets associated with user IDs in the friend information table. The access date and time column stores the date and time when a user logged in the system through the information processor 1 and the information processor 1 accessed the server 10 last time.

Figure 8:
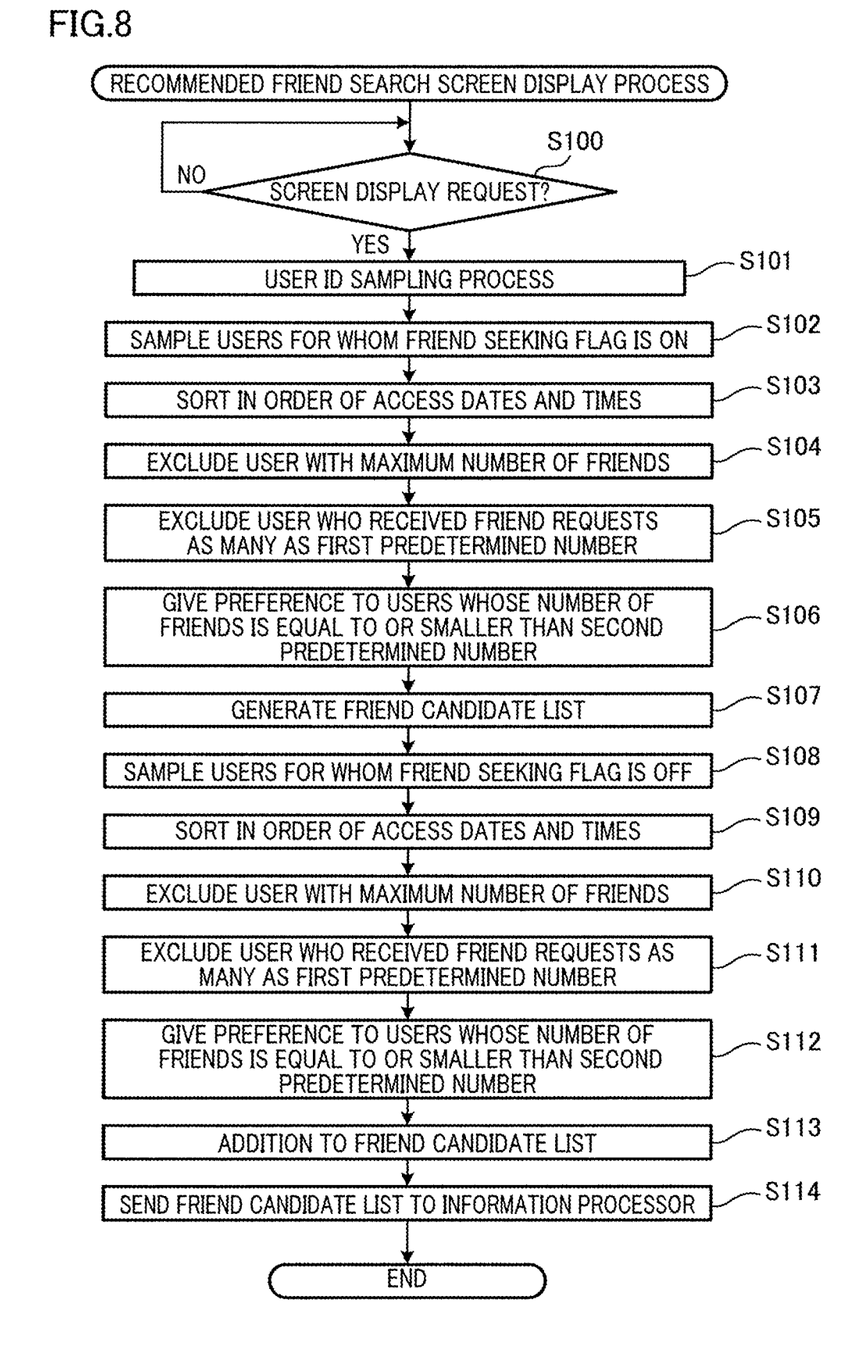
FIG. 8 is a flowchart of a recommended friend search screen display process.

With reference to FIG. 8, the following will describe a program of a recommended friend search screen display process executed by the CPU 1101 of the game server 10.

To begin with, the CPU 1101 determines whether the information processor 1 has sent a request for displaying a recommended friend search screen 23 (S100). When no request for displaying the screen has been sent (NO in S100), the CPU 1101 executes the step S100 again. When a request for displaying the screen has been sent (YES in S100), the CPU 1101 executes a user ID sampling process (S101). In the user ID sampling process, the CPU 1101 samples user IDs from the user information table (see FIG. 7). As a condition for sampling user IDs, all user IDs stored in the user information table may be sampled, or a user ID from which no access is made for a predetermined time (e.g., 3 days) may be excluded. The list of the user IDs sampled by the CPU 1101 is temporarily stored in the storage device 1104.

The CPU 1101 then refers to the friend seeking flag column of the user information table and samples users for each of whom the friend seeking flag is ON from the list of the sampled user IDs. (S102). The CPU 1101 then refers to the access date and time column of the user information table and sorts the user IDs for each of which the friend seeking flag is ON so that the user IDs having the recent dates and times are ranked high (S103).

The CPU 1101 then refers to the friend number column of the user information table and excludes user IDs with the maximum number of friends (e.g., 120) (S104). The CPU 1101 then refers to the approval waiting number column of the user information table and excludes user IDs in each of which the number of users waiting the approval has reached a first predetermined number (e.g., 20) (S105). The CPU 1101 then samples user IDs in each of which the number of friends is equal to or smaller than a second predetermined number (e.g., 50), and arrange the sampled user IDs to be ranked high (S106). The user IDs sampled and sorted through the step S102 to the step S105 are added to the friend candidate list (S107).

The CPU 1101 then refers to the friend seeking flag column of the user information table and samples users for each of which the friend seeking flag is OFF from the list of the user IDs temporarily stored in the storage device 1104 in the step S101 (S108). Then procedures similar to the step S103 to the step S107 are executed for the sampled user IDs in the step S109 to the step S112, and the user IDs sampled and sorted through these steps are arranged to be ranked low in the friend candidate list generated in the step S107 (S113). The CPU 1101 then sends the friend candidate list to the information processor 1 which has made a request to display the recommended friend search screen 23, together with the user information associated with the user IDs in the friend candidate list (S114). Upon receiving the friend candidate list from the server 10, the information processor 1 generates the friend candidate list image 230 based on the friend candidate list and the user information, and displays the recommended friend search screen 23 (see FIG. 1).

Figure 9:
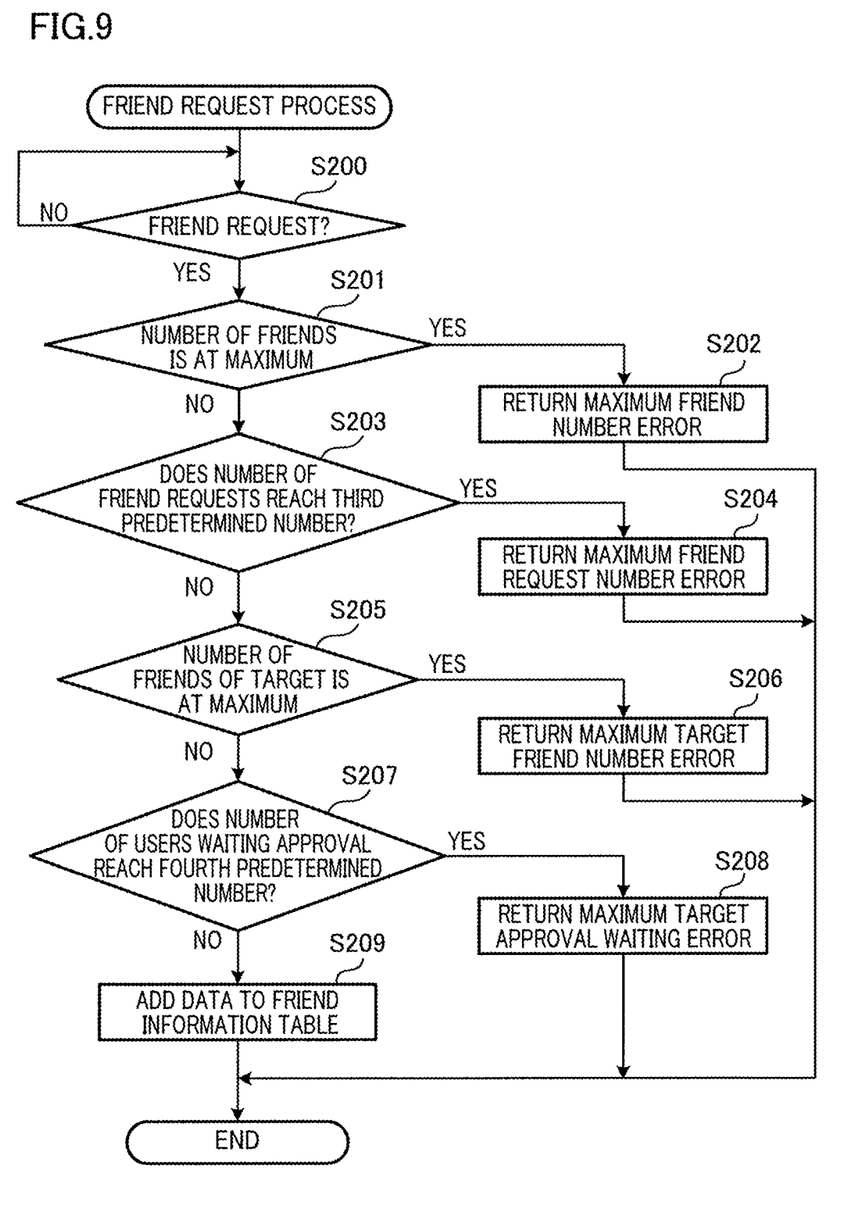
FIG. 9 is a flowchart of a friend request process.

With reference to FIG. 9, the following will describe a program of a friend request process executed by the CPU 1101 of the game server 10.

To begin with, the CPU 1101 determines whether a friend request has been made from the information processor 1 (S200). That is to say, the CPU 1101 determines whether the friend-request button 231c has been touched in the recommended friend search screen 23 displayed on the display 2 by the information processor 1. The friend request includes the user ID of the user who made the friend request and the user ID for which the friend request has been made.

When no friend request has been received (NO in S200), the CPU 1101 executes the step S200 again. When the friend request has been received (YES in S200), the CPU 1101 determines whether the number of friends of the user who made the friend request has reached the maximum number (S201). The CPU 1101 refers to the user information table (see FIG. 7). When the number in the friend number column has reached the maximum (YES in S201), the CPU 1101 sends an error message indicating that the number of friends has reached the maximum to the information processor 1 (S202). Although not illustrated, the information processor 1 having received the error message notifies the display 2, etc. that the number of friends has reached the maximum, and cancels the friend request.

When the number of friends has not reached the maximum (NO in S201), the CPU 1101 determines whether the number of friend requests of the user who made the friend request has reached a third predetermined number (e.g., 10) (S203). The CPU 1101 refers to the user information table (see FIG. 7). When the number in the friend request number column has reached the third predetermined number (YES in S203), the CPU 1101 sends an error message indicating that the number of friend requests has reached the maximum to the information processor 1 (S204), and ends the routine. Although not illustrated, the information processor 1 having received the error message notifies the display 2, etc. that the number of friend requests has reached the maximum, and cancels the friend request.

When the number of friend requests has not reached the third predetermined number (NO in S203), the CPU 1101 determines whether the number of friends of the user for which the friend request has been made has reached the maximum (S205). The CPU 1101 refers to the user information table (see FIG. 7). When the number in the friend number column associated with the user ID for which the request has been made has reached the maximum (YES in S205), the CPU 1101 sends an error message indicating that the number of friends of the targeted user has reached the maximum to the information processor 1 (S206), and ends the routine. Although not illustrated, the information processor 1 having received the error message notifies the display 2, etc. that the number of friends of the targeted user has reached the maximum, and cancels the friend request.

When the number of friends of the targeted user has not reached the maximum (NO in S205), the CPU 1101 determines whether the number of users waiting the approval of the targeted user for which the friend request has been made has reached a fourth predetermined number (e.g., 100) (S207). The CPU 1101 refers to the user information table (see FIG. 7). When the number in the approval waiting number column associated with the user ID for which the request has been made has reached the fourth predetermined number (YES in S207), the CPU 1101 sends an error message indicating that the number of users waiting the approval of the targeted user has reached the maximum to the information processor 1 (S208), and ends the routine. Although not illustrated, the information processor 1 having received this error message notifies the display 2, etc. that the number of users waiting the approval of the targeted user has reached the maximum, and cancels the friend request.

When the number of users waiting the approval of the targeted user has not reached the fourth predetermined number (NO in S207), data is added to the friend information table (see FIG. 6) (S209). In other words, the user ID of the user who has made the request is stored in the user ID column, the user ID of the targeted user is stored in the friend target column, the requesting state is stored in the state column, and the date and time when the friend request was made in the step S200 is stored in the date and time column. Then the present routine is terminated.

In the present embodiment, the game in which the user logs and plays at the information processor 1 is a slot game, the disclosure is not limited to this arrangement. For example, the game may be a card game such as poker and baccarat, a roulette game, a pachinko game, a pachinko slot game, and the like.

The base game in the slot game of the present embodiment is a game in which plural symbols are displayed (arranged) by being varied and stopped in the game area, and includes a normal game. A state in which a symbol is displayed after being varied and stopped in the game area is termed "rearrangement". As a bonus game, the free game is executed at least once in the slot game. The slot game may include a process of executing a free game where symbols are rearranged on condition that the payout rate is higher than the payout rate in the normal game and a bonus payout is awarded in accordance with the rearranged symbols.

A gaming value which is awarded when a prize is established as a result of a game result is a coin, paper money, or electrically valuable information corresponding to these. Note that the gaming value in the present invention is not particularly limited. Examples of the gaming value include game media such as medals, tokens, electronic money, tickets, and the like. A ticket is not particularly limited, and a barcoded ticket may be adopted for example. Alternatively, the gaming value may be a game point not including valuable information.

The free game is a game which is executable with a fewer amount of gaming values bet than in the normal game. Note that "bet of fewer amounts of gaming values" encompasses a bet of zero gaming value. The "free game" therefore may be a game runnable without a bet of a gaming value, which free game awards an amount of gaming values based on symbols rearranged. In other words, the "free game" may be a game which is started without consumption of a gaming value. To the contrary, the "normal game" is a game runnable on condition that a gaming value is bet, which normal game awards an amount of gaming value based on the symbols rearranged. In other words, the "normal game" is a game which starts with consumption of a gaming value.

The "unit game" is a series of operations from the start of the receiving of a bet to a state in which an award can be established. To put it differently, the unit game includes a single bet time for receiving a bet, a single game time of rearranging stopped symbols, and a single payout time of a payout process of awarding a payout.

A state in which a symbol is displayed after being varied and stopped in the game area 291 is termed "rearrangement". To put it differently, the term "rearrangement" indicates that the symbols are rearranged after the arrangement of the symbols is dismissed. Arrangement means a state where the symbols can be visibly confirmed by the user.

As the slot game, the information processor 1 has three game modes, namely the base game mode, the bonus game mode, and the random determination game mode. The base game mode is a game state during the normal game, whereas the bonus game mode is equivalent to a game state in the free game. The information processor 1 shifts to the bonus game mode when the unit game is run in the base game mode and a bonus trigger condition is satisfied in the base game mode. The trigger of the bonus game is, for example, a condition in which three or more bonus symbols consecutively appear (are rearranged) from the first reel. The trigger of the bonus game may be another condition.

In the base game mode, for example, in the game area displayed on the display 2 of the information processor 1, symbols for the slot game are rearrangeable on the video reels with 3 rows and 6 columns. In a betting process, a bet amount is selected by the user. The bet amount is, for example, selected from numbers such as 1, 2, 3, 5, and 10 by operating the bet button, or an input of a desirable number may be enabled. The resource generated by accumulating parts of bet amounts is termed jackpot.

Thereafter, in the game area, as the symbols are rearranged by varying (scroll-moving) and stopping (scroll-stop) the video reels, whether winning is achieved is determined. Then win determination is performed based on the state of the rearranged symbols. For example, the bonus game trigger is won when the bonus symbols are consecutively rearranged from the first column area (first reel) to the sixth column area (sixth reel). The bonus game trigger is also won when the bonus symbols and a wild symbol which is determined as a substitute for the bonus symbol are consecutively rearranged.

The base game mode shifts to the bonus game mode when the trigger condition of the bonus game is established, and a free game process is executed, to begin with.

In the free game process, free game reel strips used in the free game are determined, and a predetermined number of times of execution of the free game is set. The reel strips for the free game and the number of times of execution of the free game may be randomly chosen from plural selected options.

As the free game is run, win determination is executed. This win determination may be identical with the win determination in the base game. For example, when three or more bonus symbols consecutively appear from the first reel, the retrigger condition of the bonus game (free game) is established.

Thereafter, whether the free game ends is determined. If the free game has not ended (i.e., free game is continued), the free game is run for the remaining number of times.

For example, when plural slot games are playable at the information processor 1, the frequency of playing each slot game by the user may be stored in the server 10. A list of friend candidates may be generated based on an additional condition that users who like to play the same slot game as the user who is searching friends are ranked high.

Embodiments of the present invention thus described above solely serve as specific examples of the present invention, and are not to limit the scope of the present invention. The specific structures and the like are suitably modifiable. Further, the effects described in the embodiments of the present invention described in the above embodiment are no more than examples of preferable effects brought about by the present invention, and the effects of the present invention are not limited to those described hereinabove.

Further, the detailed description above is mainly focused on characteristics of the present invention to for the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the present invention described in this specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

What is claimed is:

1. A game control method by a game server including a controller and a storage device storing sets of identification information for identifying users, and connected to information processors over a communication line, the game control method comprising:

sampling sets of identification information of friend candidates from the sets of identification information in response to an input to an operation unit of one of the information processors; and generating image data for listing and displaying users corresponding to the sampled sets of identification information, wherein generating the image data comprises generating a list of the friend candidates with reference to flag data which is stored in the storage device and indicates whether a user associated with each of the sets of identification information is seeking friends, and wherein generating the list of friend candidates comprises excluding a set of identification information corresponding to a user whose number of friends is at a maximum from the list of the friend candidates, among the sampled sets of identification information.

2. The game control method according to claim 1, wherein the storage device stores an access date and time on which each of the information processors accesses the server in association with each of the sets of identification information, and wherein generating the list of the friend candidates further comprises sorting the sampled sets of identification information so that users corresponding to the sampled sets of identification information are sorted in a descending order of access dates and times.

3. The game control method according to claim 1, wherein generating the list of the friend candidates further comprises excluding a set of identification information corresponding to a user who received friend requests as many as a first predetermined number from the list of the friend candidates, among the sampled sets of identification information.

4. The game control method according to claim 1, wherein generating the list of the friend candidates further comprises sorting the sampled sets of identification information so that users each of whose number of friends is equal to or smaller than a second predetermined number are ranked at a top of the list of the friend candidates.

5. The game control method according to claim 1, wherein each of the sets of identification information is further associated with the flag data of the user associated with each of the sets of identification information, a number of first users in a friendship state with the user associated with each of the sets of identification information, a number of second users that have received friend requests from the user associated with each of the sets of identification information, and a number of third users that have transmitted friend requests to the user associated with each of the sets of identification information.

6. The game control method according to claim 5, further comprising:

receiving a friend request to an object user from an information processor of a subject user among the information processors;

determining whether a first condition that the number of first users associated with identification information of the subject user reaches a maximum number is satisfied;

determining whether a second condition that the number of second users associated with the identification information of the subject user reaches a first predetermined number is satisfied;

determining whether a third condition that the number of first users associated with identification information of the object user reaches the maximum number is satisfied;

determining whether a fourth condition that the number of third users associated with the identification information of the object user reaches a second predetermined number is satisfied; and storing data of the subject user and the object user as friend information when all of the first condition, the second condition, the third condition, and the fourth condition are not satisfied.

7. A game server connected to information processors over a communication line, comprising:

a storage device storing:

sets of identification information for identifying users, a program which samples sets of identification information of friend candidates from the sets of identification information and generates image data for listing and displaying users corresponding to the sampled sets of identification information, and flag data which indicates whether a user associated with each of the sets of identification information stored in the storage device is seeking friends; and a controller which runs the program to execute a process of when the image data is generated in response to an input to an operation unit of one of the information processors, generating a list of the friend candidates with reference to the flag data, wherein generating the list of friend candidates comprises excluding a set of identification information corresponding to a user whose number of friends is at a maximum from the list of the friend candidates, among the sampled sets of identification information.

8. The game server according to claim 7, wherein generating the list of the friend candidates further comprises excluding a set of identification information corresponding to a user who received friend requests as many as a first predetermined number from the list of the friend candidates, among the sampled sets of identification information.

9. The game server according to claim 8, wherein the controller runs the program to execute processes of:

receiving a friend request to an object user from an information processor of a subject user among the information processors;

determining whether a first condition that the number of first users associated with identification information of the subject user reaches a maximum number is satisfied;

determining whether a second condition that the number of second users associated with the identification information of the subject user reaches a first predetermined number is satisfied;

determining whether a third condition that the number of first users associated with identification information of the object user reaches the maximum number is satisfied;

determining whether a fourth condition that the number of third users associated with the identification information of the object user reaches a second predetermined number is satisfied; and storing data of the subject user and the object user as friend information when all of the first condition, the second condition, the third condition, and the fourth condition are not satisfied.

10. The game server according to claim 7, wherein each of the sets of identification information is further associated with the flag data of the user associated with each of the sets of identification information, a number of first users in a friendship state with the user associated with each of the sets of identification information, a number of second users that have received friend requests from the user associated with each of the sets of identification information, and a number of third users that have transmitted friend requests to the user associated with each of the sets of identification information.

11. A game system comprising information processors and a game server connected to the information processors over a communication line, wherein the game server comprises:

a storage device storing:
sets of identification information for identifying users;
a program which samples sets of identification information of friend candidates from the sets of identification information and generates image data for listing and displaying users corresponding to the sampled sets of identification information; and
flag data which indicates whether a user associated with each of the sets of identification information stored in the storage device is seeking friends; and a controller running the program to execute a process of when the image data is generated in response to an input to an operation unit of one of the information processors, generating a list of the friend candidates with reference to the flag data, wherein generating the list of friend candidates comprises excluding a set of identification information corresponding to a user whose number of friends is at a maximum from the list of the friend candidates, among the sampled sets of identification information.

12. The game system according to claim 11, wherein generating the list of the friend candidates further comprises excluding a set of identification information corresponding to a user who received friend requests as many as a first predetermined number from the list of the friend candidates, among the sampled sets of identification information.

13. The game system according to claim 11, wherein each of the sets of identification information is further associated with the flag data of the user associated with each of the sets of identification information, a number of first users in a friendship state with the user associated with each of the sets of identification information, a number of second users that have received friend requests from the user associated with each of the sets of identification information, and a number of third users that have transmitted friend requests to the user associated with each of the sets of identification information.

14. The game system according to claim 13, wherein the controller runs the program to execute processes of:

receiving a friend request to an object user from an information processor of a subject user among the information processors;

determining whether a first condition that the number of first users associated with identification information of the subject user reaches a maximum number is satisfied;

determining whether a second condition that the number of second users associated with the identification information of the subject user reaches a first predetermined number is satisfied;

determining whether a third condition that the number of first users associated with identification information of the object user reaches the maximum number is satisfied;

determining whether a fourth condition that the number of third users associated with the identification information of the object user reaches a second predetermined number is satisfied; and storing data of the subject user and the object user as friend information when all of the first condition, the second condition, the third condition, and the fourth condition are not satisfied.

* * * * *